United States Patent [19]
Hess et al.

[11] Patent Number: 5,054,068
[45] Date of Patent: Oct. 1, 1991

[54] TRUNKED RADIO COMMUNICATION SYSTEM HAVING ENCRYPTED SYSTEM CONTROL INFORMATION

[75] Inventors: David W. Hess, Rolling Meadows; Gary W. Grube, Palatine; Robert J. Locascio, Crystal Lake, all of Ill.

[73] Assignee: Motorola, Inc., Schaumburg, Ill.

[21] Appl. No.: 519,615

[22] Filed: May 7, 1990

[51] Int. Cl.$^5$ .............................................. H04L 9/00
[52] U.S. Cl. ......................................... 380/49; 380/9; 380/37; 455/33; 455/54; 379/59
[58] Field of Search .................. 364/200, 900; 380/36, 380/37, 49, 50, 9; 455/14, 33, 54; 379/58, 59

[56] References Cited

U.S. PATENT DOCUMENTS 4,882,751 11/1989 Kotzin et al. ............................. 380/9

FOREIGN PATENT DOCUMENTS 0334746 9/1989 European Pat. Off. .............. 455/33

*Primary Examiner*—Bernarr E. Gregory
*Attorney, Agent, or Firm*—Steven G. Parmelee

[57] ABSTRACT

A trunked communication system having a control resource that encrypts system control messages. In one embodiment, the encryption includes controlling a bit interleaving process (208, 311) as a function of an encryption key (203, 321). In another embodiment, the encryption process includes reordering (202, 302) the information bits that constitute the message itself. If both encryption processes are used, the controlling encryption key can either be the same for both processes, or different.

9 Claims, 3 Drawing Sheets

TRUNKED RADIO COMMUNICATION SYSTEM HAVING ENCRYPTED SYSTEM CONTROL INFORMATION

TECHNICAL FIELD

This invention relates generally to radio communication systems, and more particularly to trunked communication systems wherein communication resources are flexibly allocated amongst communication units.

BACKGROUND OF THE INVENTION

Trunked radio communication systems are known. The Smartnet and Privacy Plus systems offered by Motorola, Inc., and the 16 PLUS and Sweet Sixteen systems offered by General Electric, provide an infrastructure that includes a plurality of repeaters that each operate on different frequencies, wherein at least one of these frequencies generally functions as a dedicated control channel for supporting the transmission and reception of system control information, such as requests from communication units for communication resources to support desired communications, and communication resource allocation information. Other systems, such as the Clear Channel system offered by E. F. Johnson, provides such system control information in a subaudible portion of the channel as transmitted by a plurality of their repeaters. Regardless of the system, this system control information typically assumes the form of tone or digitally encoded messages that are intended for the appropriate logic section of the system infrastructure and/or the radio, and not the ears of the user.

Encrypted trunked communication systems are also known. In such systems, the verbal messages of the users are encrypted by one form or another to render unauthorized eavesdropping more difficult. In a similar manner, data messages have been encrypted on trunked systems, wherein the data comprises user information, and not system control information as described above.

As the sophistication of electronic eavesdroppers has grown, a commensurate need to render more difficult their unauthorized activities has grown. It now becomes more important to provide for the encryption of system control information, sometimes in conjunction with encrypted user messages, and sometimes not. Preferably, the encryption technique employed would be generally compatible with much of the trunking infrastructure that is currently installed and operational. Furthermore, the encryption methodology should preferably accommodate a variety of encryption approaches, and should support flexibility and ease of revision.

SUMMARY OF THE INVENTION

These needs and others are substantially met through provision of the communication system having encrypted system control messages as described herein. Pursuant to this invention, a system control message comprising a plurality of information bits is bit interleaved as a function, at least in part, of an encryption key.

In one embodiment of the invention, the information bits that comprise the system controlled message can be further encrypted by reordering the information bits as a function of a second encryption key. Depending upon the application, the second encryption key may, or may not, be the same as the first encryption key.

Decryption, of course, then becomes a function of reordering the bits as originally ordered and bit interleaved as a function of the two encryption keys.

BEST MODE FOR CARRYING OUT THE INVENTION

Figure 1:
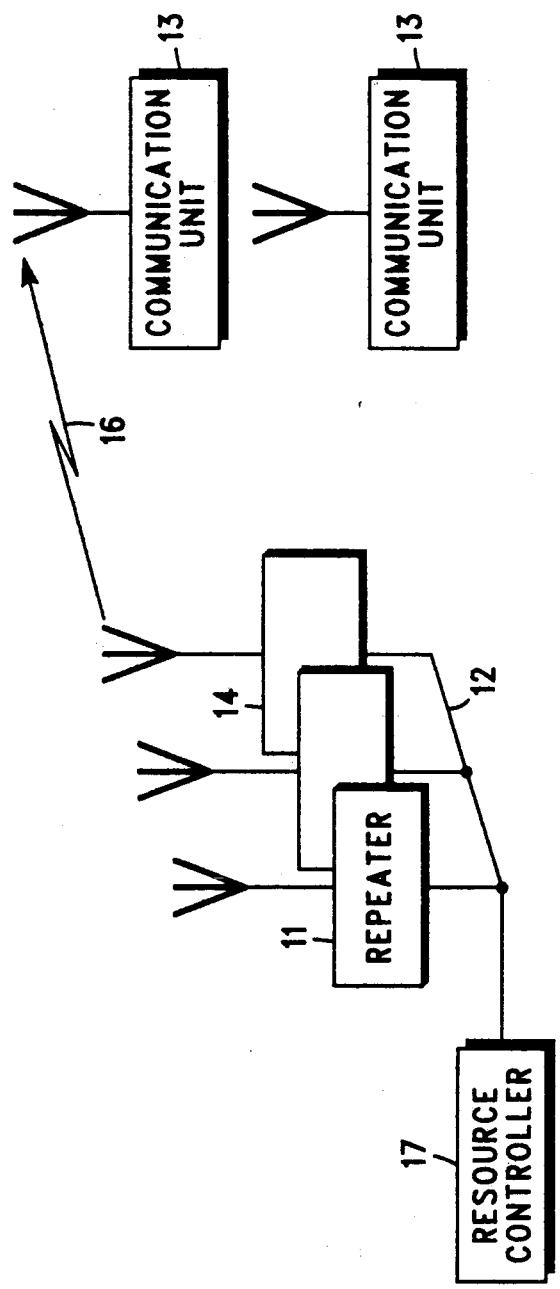
FIG. 1 comprises a block diagram depiction of a system configured in accordance with the invention.

Two embodiments of a trunked communication system suitable for use in supporting the invention will be described with reference to FIG. 1.

In a first embodiment, the trunked communication system includes a plurality of repeaters (11) wherein the repeaters (11) are coupled together via an appropriate communications bus (12) (this bus will typically comprise a landline, but may take other forms as well as appropriate to a particular application). Each repeater functions to receive and transmit on preassigned frequency pairs to facilitate communication with a plurality of communication units (13) (as used herein, the term communication units is intended to refer to mobile transceivers, portable transceivers, fixed location transceivers, and so forth).

Depending upon the application, one of these repeaters (14) can be at least temporarily assigned as a dedicated control resource. Pursuant to such an embodiment, system control information, in particular messages that relate to allocation of the remaining repeaters and the communication resources they support, can be transceived over this dedicated communication resource (16).

In an alternative embodiment of this same architecture, the signalling information can be transmitted on a number of the repeaters (11), and preferably all of the repeaters (11). To avoid interfering with the voice communications that are also submitted by these resources, the control information is transmitted in a manner so as not to interfere with the voice communications. For example, the control signalling can be transmitted subaudibly to the voice information, or supra audibly thereto. In the alternative, the frequencies that support the communications can be time division multiplexed, wherein some of the resulting time slots support voice communication and some support system control information. Regardless of the selected methodology, system control information is still transmitted to the communication units (13) and received therefrom.

In an alternative embodiment, the repeaters (11) can be coupled to and controlled by a separated resource controller (17), such as a central controller as used in Smartnet and Privacy Plus systems. In such a system, the resource controller (17) communicates with the various repeaters (11) to ascertain system communication needs and capabilities, and directs allocation of the various communication resources as a function, at least in part, thereof.

To summarize, the allocation of communication resources is facilitated through the transmission and reception of system control messages, which messages can be facilitated in a variety of ways. The resource allocations are directed by a resource controller, which may be either a discrete component to the infrastructure, or which may be a distributed function through other elements of the infrastructure, such as the repeaters themselves.

Figure 2:
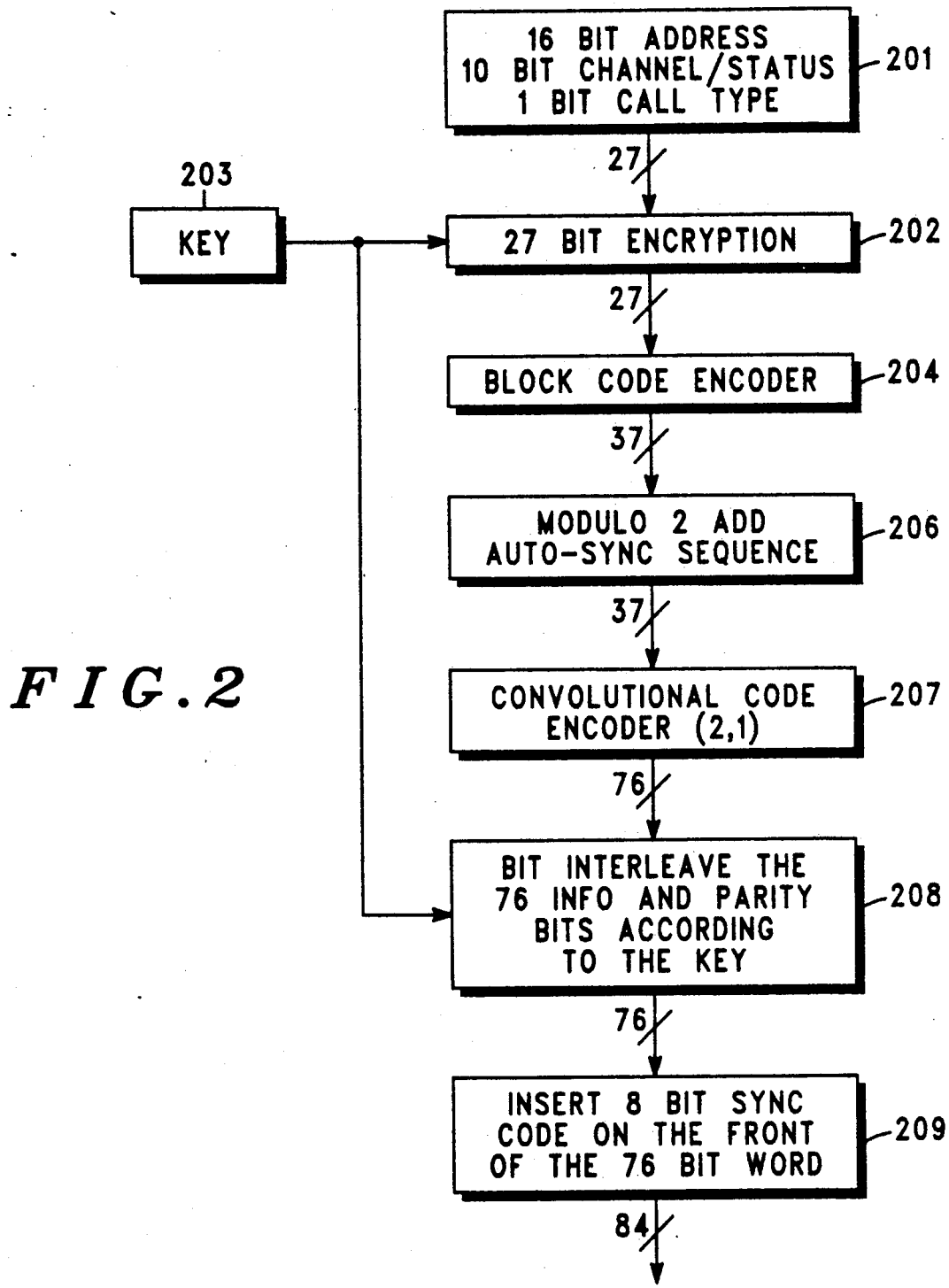
FIG. 2 comprises a flow diagram depicting an encryption process in accordance with the invention.

Methodology for producing a resource controller initiated system control message will now be described with reference to FIG. 2.

To begin, an initial system control message is formed. This system control message is comprised of a plurality of information bits (201), including, in this example, 16 bits to support an address, 10 bits to support assigned channel information and status information, and 1 bit to indicate the call type. In this particular embodiment, then, the original system control message constitutes a 27 bit word or words. Next, these 27 bits have their order rearranged (202) to provide for the encryption thereof as a function of an appropriate encryption key (203). The particular encryption engine is not critical to this application. Instead, it is only necessary that a predetermined encryption key be utilized in some manner to alter the original order of the information bits that constitute the system control message.

Next, the encrypted information bits are subjected to a block code encoder process (204) to provide a measure of error detection capability. The resulting 37 bits are then modulo two added with an auto sync sequence (206) to provide additional error detection capability. Additional information regarding the latter two processes is described in detail in U.S. Pat. No. 4,312,070 as issued for a Digital Encoder/Decoder to Coombes et al., which reference is incorporated herein by this reference.

The resulting 37 bits are then subjected to a convolutional code process (207). Additional information regarding such convolutional coding can be found in U.S. Pat. No. 4,217,660 for a Method and Apparatus for Coding and Decoding Digital Data as issued to En, which patent is incorporated herein by this reference. The resulting 76 bit (37 of which are information bits and 37 of which are parity bits) are then bit interleaved (208) in accordance with a key (203). Depending upon the application, this key may either be identical to the key used to reorder the original information bits, or may be different therefrom.

Subsequent to the above, an 8 bit sync code is added to the 76 interleaved bits (209), and the resulting 84 bits are then transmitted over the communication resource to the communication units. Additional general information regarding the above, with the exception of the two encryption steps, can be found in U.S. Pat. No. 4,692,945 for a Dispatch Trunked Radio System as issued to Zdunek, which patent is incorporated herein by this reference.

Figure 3:
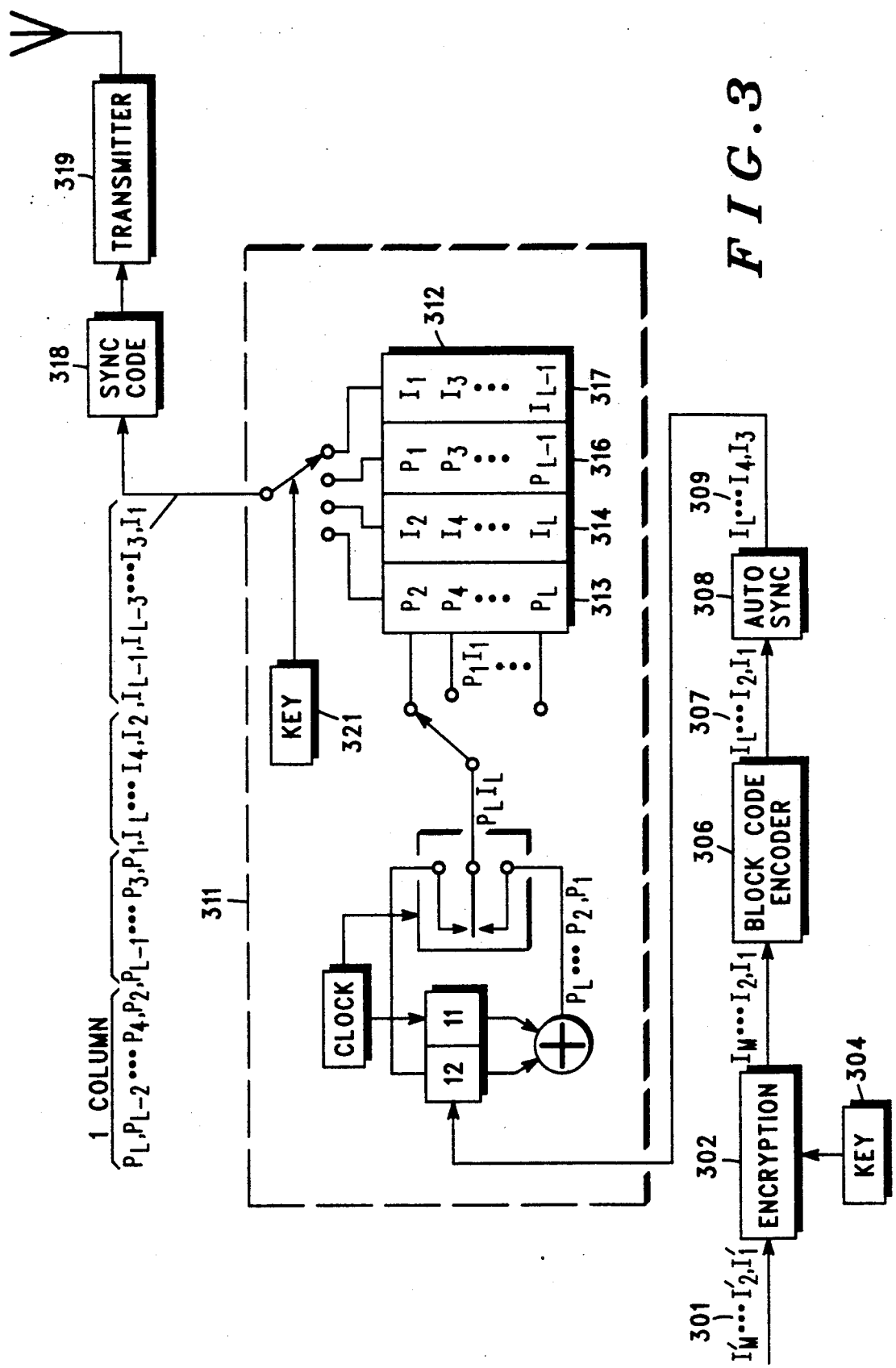
FIG. 3 comprises a block diagram depiction of the encryption process in accordance with the invention.

FIG. 3 depicts a block diagram mechanism for supporting the above described methodology. As described above, an original group of information bits (301) are provided to an encryption block (302) that reorders the information bits as a function, at least in part, of a key (304). Subsequently, the resultant reordered bits are provided to a block code encoder (306), and the resulting bits (307) are then provided to an auto sync sequence mechanism (308).

The resultant bit stream (309) then enters a convolutional code and coder (311) that combines the information bits (IL-I1) with parity bits (PL-P1). As described in the above referenced U.S. Pat. No. 4,217,660, the resultant information and parity bits are then stored in a matrix (312) to form, in this embodiment, 4 columns of bits. In this particular embodiment, the first column (313) includes the bits PL-P2 (i.e., the even parity bits). The second column (314), includes the even information bits, the third column (316), includes the odd parity bits, and the fourth column (317) includes the odd information bits. These columns are then subsequently emptied (i.e., read) to yield an output stream of bit interleaved bits that are then supplemented with a sync code (318) and transmitted (319).

Important to this embodiment, the columns of the matrix (312) are emptied in an order that is determined as a function, at least in part, of an encryption key (321), which encryption key (321) may be the same as, or intentionally different than, the key (304) referred to earlier. In this particular embodiment, the key (321) has determined a bit interleaving order wherein the even parity bits are followed by the odd parity bits, which are then followed by the even information bits and finally by the odd information bits. This order can of course be altered depending upon the key (321) selected. In an alternative embodiment, it would also be possible to alter the order in which a selected column was emptied. For example, as depicted in the figure, the columns can each be emptied either from the top down, or from the bottom up. Utilizing this particular aspect would double the number of encryption possibilities.

The above process and apparatus supports the transmission of a system control message from the resource controller to the various communication units. The communication units utilize an identical process to transmit system control messages back to the resource controller, with the exception that the original system control information will typically include only 21 bits at the outset, these representing 16 bits for an address and 5 bits for status. Other than this one difference, the same process is utilized, and hence need not be described here in any further detail.

Figure 4:
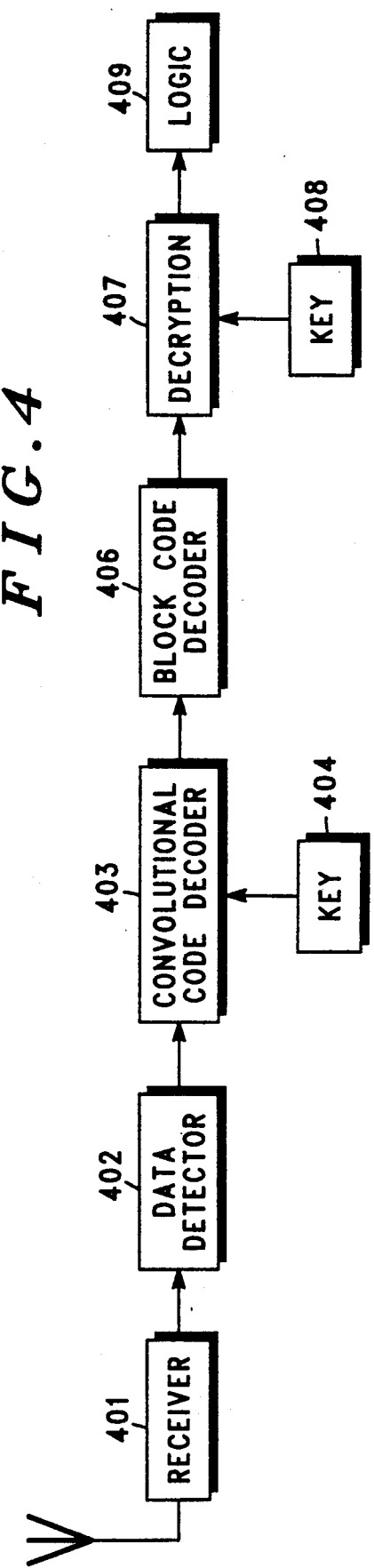
FIG. 4 comprises a block diagram depiction of a portion of the decryption process in accordance with the invention.

FIG. 4 depicts a block diagram of an apparatus to appropriately recover such a message. A radio receiver (401) receives the message as indicated above and appropriately demodulates it to recover the individual bit stream. An appropriate data recovery mechanism (402) then parses the incoming bit stream to recover the system control message. A convolutional code decoder (403) accepts this incoming bit stream, and separates the information bits from the parity bits as a function, at least in part, of an encryption key (404). (Additional detailed information explaining operation of such a convolutional code decoder can be found in the previously mentioned U.S. Pat. No. 4,217,660, and hence no further description need be provided here). The resulting recovered information bits are then subjected to a block code decoder (406), following which the order of the information bits in their encrypted form can be reordered pursuant to a decryption process (407) that functions, at least in part, in response to an encryption key (408). The two encryption keys (404 and 408) can be identical to one another, or may be different from one another to support the needs of a particular application.

Lastly, the recovered and properly reordered information bits that constitute the system control message are provided to a logic unit (409) that can properly interpret the message and respond accordingly.

What is claimed is:

1. A method for use with a trunked radio communication system, wherein the trunked radio communication system functions, at least in part, to allocate communication resources from time to time amongst a plurality of communication units, and wherein at least some of the communication resources are so allocated by transmission of system control information on a system control resource, the method comprising the steps of:
   A) forming a system control message to support allocation of the communication resources, wherein the system control message includes a plurality of information bits;
   B) providing a first encryption key;
   C) reordering amongst themselves the information bits, as a function of the first encryption key, to form a reordered system control message;
   D) transmitting a signal based at least in part on the reordered system control message.

2. The method of claim 1, wherein step (B) further includes the step of:
   B1) reordering the order of the information bits as a function, at least in part, of the first encryption key;
   and wherein, in step (C), the reordered information bits are again reordered as a function, at least in part, of the first encryption key, to form the reordered system control message.

3. The method of claim 1, wherein step (B) further includes the steps of:
   B1) providing a second encryption key;
   B2) reordering the order of the information bits as a function, at least in part, of the second encryption key;
   and wherein, in step (C) the reordered information bits are reordered as a function, at least in part, of the first encryption key, to form the reordered system control message.

4. A method for use with a trunked radio communication system, wherein the trunked radio communication system functions, at least in part, to allocate communication resources from time to time amongst a plurality of communication units, and wherein at least some of the communication resources are so allocated by transmission of system control information on a system control resource, the method comprising the steps of:
   A) forming a system control message to support, at least in part, allocation of the communication resources, wherein the system control message includes a plurality of information bits in a predetermined order;
   B) processing the information bits of the system control message to provide at least an error protected system control message;
   C) providing a first encryption key;
   D) reordering amongst themselves the information bits of the error protected system control message, as a function, at least in part, of the first encryption key, to form a reordered error protected system control message;
   E) transmitting a signal, using the control resource, based at least in part on the reordered error protected system control message.

5. The method of claim 4, wherein step (B) includes the step of processing the information bits in a block encoder to provide block encoded information bits.

6. The method of claim 5, wherein step (B) further includes the step of processing the block encoded information bits in a convolutional code encoder to provide the error protected system control message.

7. The method of claim 4, wherein step (A) further includes the step of:
   A1) forming a system control message comprising a plurality of information bits in an original order;
   A2) processing the information bits as a function, at least in part, of a second encryption key, to revise the order of the information bits to provide the information bits in the predetermined order.

8. The method of claim 7, wherein the first encryption key and the second encryption key are identical to one another.

9. The method of claim 7, wherein the first encryption key and the second encryption key are different from one another.

* * * * *